(12) United States Patent
Yoshioka

(10) Patent No.: US 8,127,052 B2
(45) Date of Patent: Feb. 28, 2012

(54) DATA TRANSFER CONTROL DEVICE AND COMPUTER SYSTEM

(75) Inventor: Keisuke Yoshioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 147 days.

(21) Appl. No.: 12/440,703

(22) PCT Filed: Sep. 5, 2007

(86) PCT No.: PCT/JP2007/067319
§ 371 (c)(1),
(2), (4) Date: Mar. 10, 2009

(87) PCT Pub. No.: WO2008/068937
PCT Pub. Date: Jun. 12, 2008

(65) Prior Publication Data
US 2010/0042757 A1    Feb. 18, 2010

(30) Foreign Application Priority Data
Dec. 1, 2006 (JP) .................................. 2006-325868

(51) Int. Cl.
*G06F 13/12* (2006.01)
(52) U.S. Cl. .................................. 710/22; 710/7; 710/20
(58) Field of Classification Search .................. None
See application file for complete search history.

(56) References Cited

U.S. PATENT DOCUMENTS

| | | | | |
|---|---|---|---|---|
| 5,005,121 A | * | 4/1991 | Nakada et al. | 710/26 |
| 5,835,788 A | * | 11/1998 | Blumer et al. | 710/23 |
| 6,415,338 B1 | * | 7/2002 | Habot | 710/22 |
| 2005/0135367 A1 | * | 6/2005 | Chandra et al. | 370/392 |
| 2005/0165980 A1 | * | 7/2005 | Clayton et al. | 710/22 |

FOREIGN PATENT DOCUMENTS

| | | | |
|---|---|---|---|
| JP | 57-132229 A | | 8/1982 |
| JP | 61-204755 A | | 9/1986 |
| JP | 3-74752 A | | 3/1991 |
| JP | 5-94404 A | | 4/1993 |
| JP | 10187659 A | * | 7/1998 |
| JP | 2000-215152 A | | 8/2000 |

* cited by examiner

*Primary Examiner* — Eron J Sorrell
(74) *Attorney, Agent, or Firm* — Birch, Stewart, Kolasch & Birch, LLP

(57) ABSTRACT

A data transfer control device includes a control component (DMA controller 5) which acquires a data transfer instruction including, as its parameters, start memory addresses or start input/output addresses and data transfer size of the peripheral devices to be used as the transfer source and transfer destination when carrying out data transfer from a first peripheral device (peripheral (A)) to a second peripheral device (peripheral (B)); which reads out target data from the first peripheral device in accordance with the parameters; and which processes the target data and then transfers to the second peripheral device.

10 Claims, 3 Drawing Sheets

FIG. 3
(a) 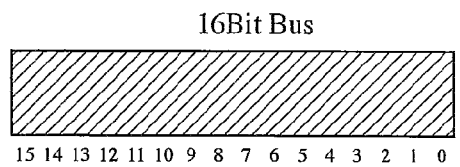
(b) 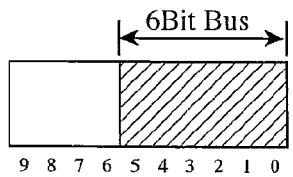
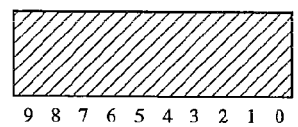
FIG. 4
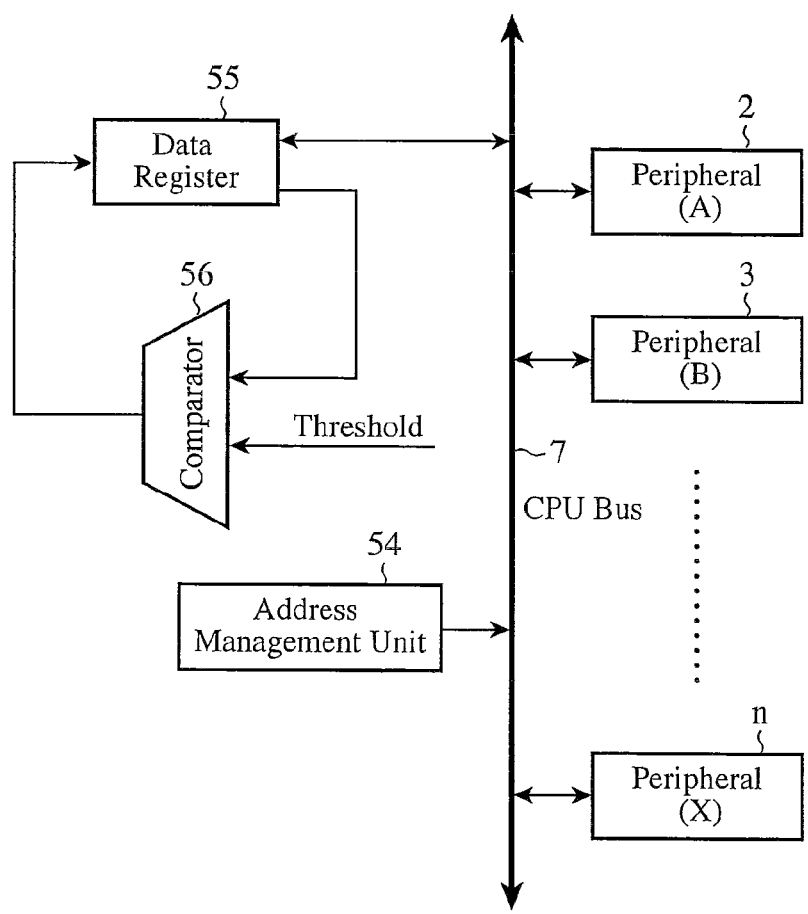

DATA TRANSFER CONTROL DEVICE AND COMPUTER SYSTEM

TECHNICAL FIELD

The present invention relates to a data transfer control device and computer system, which transfer data between peripheral devices including a memory without the aid of a central processing unit.

BACKGROUND ART

In a microcomputer system, a technology is known which tries to reduce a processing load of the CPU by transferring data between peripheral devices including a memory without the aid of a microprocessor (CPU: Central Processing Unit) serving as a control center. In this case, a DMA (Direct Memory Access) controller, which is programmable by the CPU, carries out the data transfer control.

In addition, to further improve a throughput in the foregoing microcomputer system, a DMA controller is known which stores in a ROM instruction groups corresponding to specific requests from the CPU, and carries out data transfer control between peripheral devices in accordance with a specific instruction read out of the ROM (see Patent Document 1, for example).

Furthermore, to transfer data between a peripheral device and a main storage having data bus widths different from each other without the aid of the CPU, a DMA controller is known which transfers data by adjusting the data width to that of the device having the broader bus width (see Patent Document 2, for example). Here, the term "data bus width" refers to the amount of data that can be sent simultaneously per transfer.

Patent Document 1: Japanese Patent Laid-Open No. 2000-215152.

Patent Document 2: Japanese Patent Laid-Open No. 5-94404/1993.

According to the technology disclosed in the foregoing Patent Document 1, the data transfer is automated and the involvement of the CPU in it can be reduced to a minimum. However, as for the processing contents the peripheral device at a transfer destination requests for at a transfer such as data transfer between peripheral devices having different data bus widths, they become a load of the CPU so that the reduction in the processing load of the CPU is not yet enough.

On the other hand, according to the technology disclosed in Patent Document 2, since the DMA controller adjusts the data bus widths at the DMA transfer between the peripheral device and main storage, it can eliminate the foregoing processing load of the CPU. However, a problem still remains in that it can only cope with the case where the data bus width is an integer multiple of the data bus width of the peripheral device.

The present invention is implemented to solve the foregoing problems. Therefore it is an object of the present invention to provide a data transfer control device and a computer system capable of improving the throughput by further reducing the processing load of the CPU by constructing a device for performing operations requested by a transfer destination peripheral device on the data read out of a transfer source peripheral device.

DISCLOSURE OF THE INVENTION

To solve the foregoing problems, a data transfer control device in accordance with the present invention includes a control component configured to be started by the central processing unit; to acquire, when carrying out data transfer from the first peripheral device to the second peripheral device, a data transfer instruction including, as its parameters, start memory addresses or start input/output addresses and data transfer size of the peripheral devices to be used as a transfer source and a transfer destination; to read target data from the first peripheral device in accordance with the parameters; and to process the target data, followed by transferring the target data to the second peripheral device.

In addition, a computer system in accordance with the present invention includes an external memory for storing a data transfer instruction in advance, the data transfer instruction having, as its parameters, start memory addresses or start input/output addresses and data transfer size of the transfer source and of the transfer destination; and a data transfer control device for reading the data transfer instruction from the memory, for reading target data from the transfer source peripheral device in accordance with the parameters, and for processing the target data, followed by transferring the target data to the transfer destination peripheral device.

According to the present invention, constructing on the data transfer control device a device for performing operations requested by a transfer destination peripheral device on the data read out of the transfer source peripheral device makes it possible to further reduce the processing load of the CPU and to improve the throughput.

BRIEF DESCRIPTION OF THE DRAWINGS

FIG. 3 is a schematic diagram showing the operation of the data transfer control device of the embodiment 1 in accordance with the present invention; and FIG. 4 is a block diagram showing a configuration of a computer system of an embodiment 3 in accordance with the present invention.

BEST MODE FOR CARRYING OUT THE INVENTION

The best mode for carrying out the invention will now be described with reference to the accompanying drawings to explain the present invention in more detail.

Embodiment 1

Figure 1:
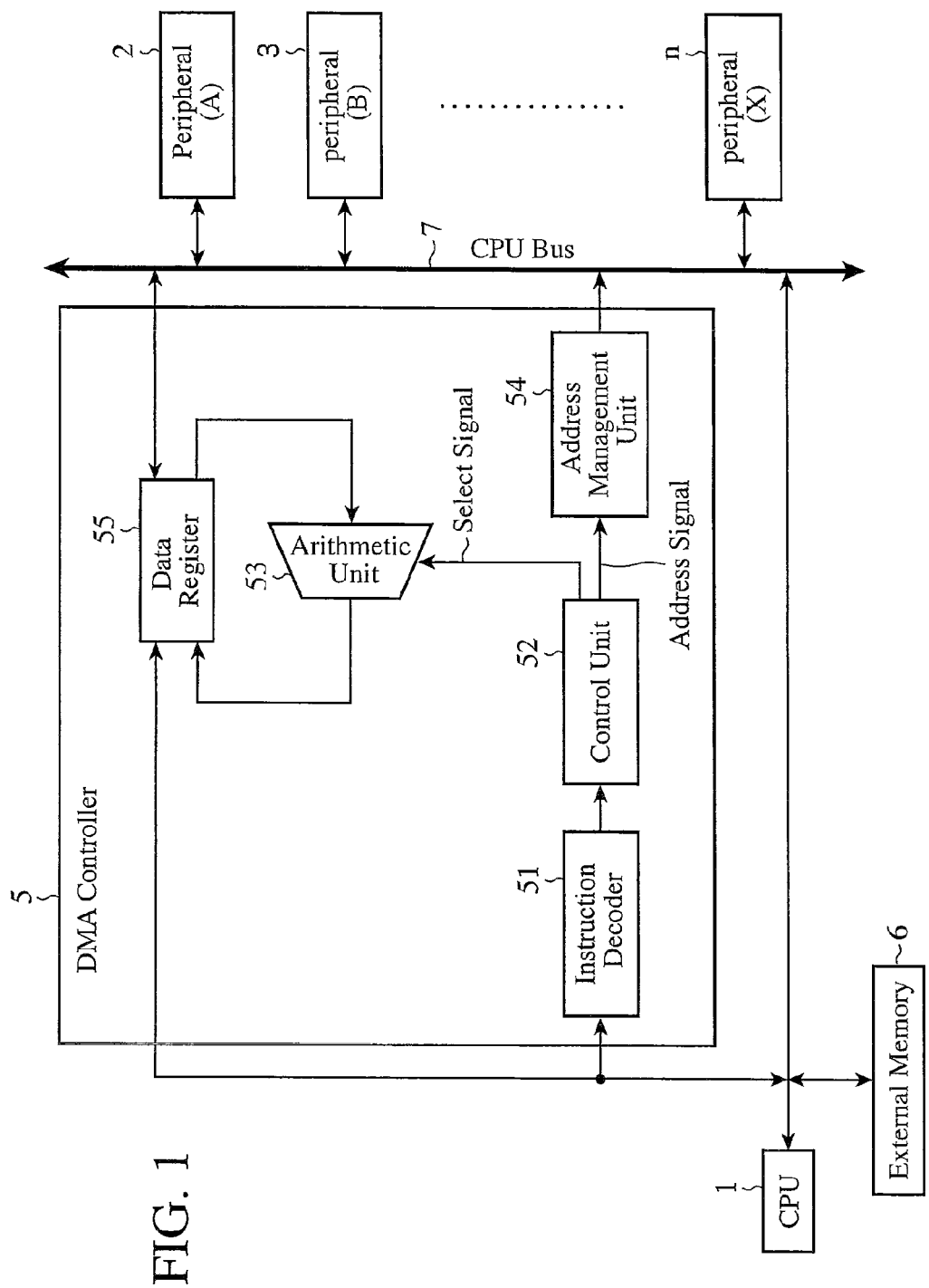
FIG. 1 is a block diagram showing an example of a configuration of a computer system of an embodiment 1 in accordance with the present invention.

FIG. 1 is a block diagram showing an example of a configuration of a computer system of an embodiment 1 in accordance with the present invention.

The computer system (microcomputer system, here) shown in FIG. 1 has a CPU 1 serving as the control center, a plurality of peripheral devices 2, 3, . . . , n (referred to as peripherals (A), (B), . . . , (X), respectively, from now on), a DMA controller 5 serving as a data transfer control device in accordance with the present invention, and an external memory 6, which are connected in common via a CPU bus 7 consisting of a plurality of lines for address, data and control.

The CPU 1 reads a program stored in an internal memory or external memory 6 successively, and controls the peripheral (A) 2, peripheral (B) 3, peripheral (X) n, and DMA controller 5 connected to the CPU bus 7.

Here each of the peripherals (A) 2, (B) 3, and (X) n is supposed to be an input/output device including a memory device such as a flash memory or hard disk.

The DMA controller 5 is a data transfer control device for transferring data between the peripheral (A) 2, (B) 3, and (X) n without the aid of the CPU 1. The DMA controller 5 has a control component which is started by the CPU 1 to transfer data from a first peripheral device (peripheral (A), for example) 2 to a second peripheral device (peripheral (B), for example) 3; acquires from the external memory 6 a data transfer instruction including as its parameters start memory addresses or start input/output addresses and data transfer size of the peripherals serving as a transfer source and a transfer destination; reads data out of the peripheral (A) 2 in accordance with the parameters; and transfers the data to the peripheral (B) 3 after applying a process (calculation).

As the control component, the DMA controller 5 has an instruction decoder 51, a control unit 52, an arithmetic unit 53, an address management unit 54 and a data register 55 as shown in FIG. 1.

The instruction decoder 51 decoder an instruction such as a data transfer instruction contained in an instruction group which corresponds to a specific request from the CPU 1 and is stored in the external memory 6 in advance, and outputs it to the control unit 52. According to the decoding result of the instruction decoder 51, the control unit 52 generates a first control signal (referred to as an address setting signal or address update signal from now on) for controlling the address management unit 54 and a second control signal (referred to as a select signal from now on) for controlling the arithmetic unit 53, and outputs them to the address management unit 54 and arithmetic unit 53, respectively.

According to the select signal which is output by the control unit 52 and indicates an arithmetic type, the arithmetic unit 53 applies, to the data acquired from the transfer source peripheral via the data register 55, a NOP operation (data through), bit shift operation, logical operation such as AND, OR and XOR, or arithmetical operation such as addition, subtraction, multiplication and division; and outputs to the transfer destination peripheral via the data register 55 again.

The address management unit 54 carries out the address update management in accordance with the start memory address or start input/output address, and the data transfer size of the transfer source or transfer destination peripheral, which are set by the control unit 52; controls data read/write from the transfer source peripheral or to the transfer destination peripheral; and sets in the data register 55 the data read from the transfer source peripheral or the data to be written into the transfer destination peripheral.

Figure 2:
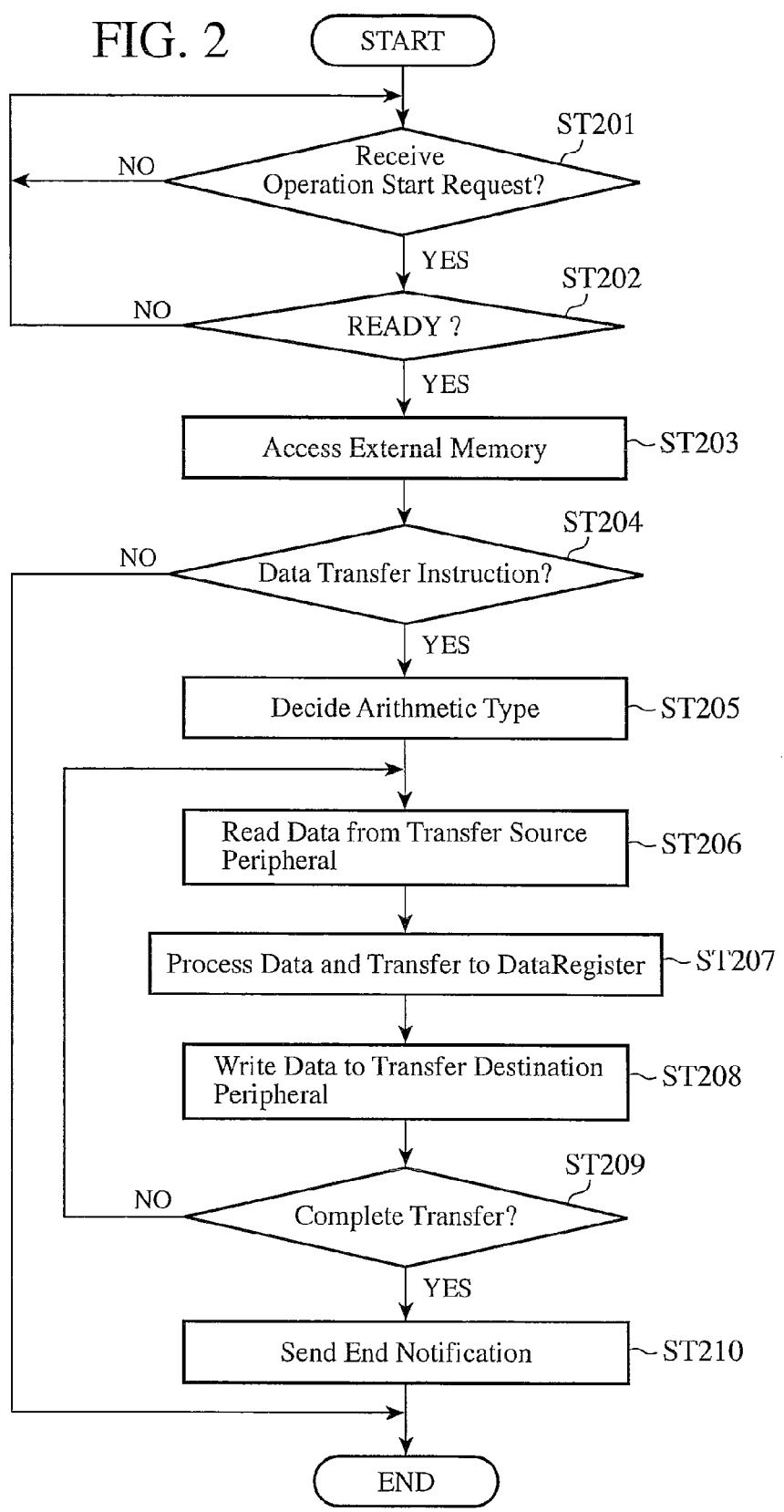
FIG. 2 is a flowchart cited for explaining the operation of a data transfer control device of the embodiment 1 in accordance with the present invention.

FIG. 2 is a flowchart cited for explaining the operation of the data transfer control device of the embodiment 1 in accordance with the present invention (DMA controller 5).

Referring to the flowchart shown in FIG. 2, the operation of the data transfer control device of the embodiment 1 in accordance with the present invention shown in FIG. 1 will be described in detail.

First, while the CPU 1 is carrying out the main routine based on an application, it issues an operation start request to the DMA controller 5 in response to a data transfer request. Receiving the operation start request (step ST201), the DMA controller 5 sends, if it is in a READY mode ("YES" at step ST202) as shown in FIG. 2, an ACK response to the CPU 1. Thus, the CPU 1 relinquishes the CPU bus 7 to the DMA controller 5 so that the CPU 1 can execute other processing of the main routine.

If the DMA controller 5 is BUSY ("NO" at step ST202), the CPU 1 sends a NAK, and interposes a WAIT of a certain time period, or waits for a next operation start request.

On the other hand, the DMA controller 5 reads a data transfer instruction from the external memory 6 (step ST203) in response to the operation start request fed from the CPU 1, and decodes the instruction with the instruction decoder 51 it includes. If the decoding result is the data transfer instruction ("YES" at step ST204), the DMA controller 5 decides the arithmetic type of the arithmetic unit 53 in accordance with the select signal output from the control unit 52 started by the instruction decoder 51 (step ST205). The arithmetic type includes a NOP operation, bit shift operation, logical operation such as AND, OR and XOR, and arithmetical operation relating to addition, subtraction, multiplication and division.

In this case, the address management unit 54 generates the address of the transfer source peripheral A (2) and the address of the transfer destination peripheral B (3) in response to the address signal output from the control unit 52, and outputs them onto the CPU bus 7.

Thus, in response to the address signal output by the address management unit 54, the arithmetic unit 53 reads out the transfer data successively from the transfer source peripheral (A) 2 (step ST206), and processes the data which is set in the data register 55 by performing the predetermined operation on the data (step ST207). Then, the arithmetic unit 53 puts the data in the data register 55, and transfers the data to the transfer destination peripheral (B) 3 via the CPU bus 7 (step ST208).

Here, the address management unit 54 updates and manages the set addresses one after another during the foregoing data transfer, issues an end notification to the CPU 1 when it detects the end of the data transfer in accordance with the transfer size set ("YES" step ST209), and completes the foregoing data transfer processing (step ST210).

FIG. 3 is a schematic diagram showing a state in which the arithmetic unit 53 carries out the data transfer by performing the bit shift operation without being limited by the data bus width.

It schematically shows a state of conversion from a 16-bit data bus to a 10-bit data bus. In other words, it is assumed that the transfer source peripheral (here peripheral (A)) 2 has a 16-bit data bus width and the transfer destination peripheral (here peripheral (B)) 3 has a 10-bit data bus width.

More specifically, as shown in the flowchart of FIG. 2, the arithmetic unit 53 reads out the transfer data from the transfer source peripheral (A) 2 successively at step ST206 in accordance with the address signal output from the address management unit 54. Then, at step ST207, the arithmetic unit 53 performs the bit shift operation on the 16-bit data set in the data register 55 (FIG. 2(*a*)) in accordance with the select signal output from the control unit 52 in such a manner that it meets the data bus width (10-bit) of the peripheral (B) 3, and writes successively in the data register 55. After that, at step ST208, the arithmetic unit 53 reads 10-bit data and 6-bit data constituting the total of 16-bit data written in the data register 55, and transfers to the peripheral (B) 3 via the CPU bus 7.

According to the foregoing embodiment 1, the DMA controller 5 enables data transfer between the peripherals with different data bus widths by performing bit shift operation on the data read out of the transfer source peripheral in accordance with the instruction read out of the external memory 6, and by transferring to the transfer destination peripheral. In this case, the DMA controller 5 adjusts the unit of the transfer by the bit shift operation. Accordingly, the embodiment 1 offers an advantage of being free from the limit of the data bus width of the peripheral.

Thus, it can solve the conventional weak point of being unable to handle the data bus width except for the data bus width which is integer multiple of that of the peripherals. In addition, it offers an advantage of being able to cope with the changes in the data bus width of the peripherals connected to the computer system flexibly because the instructions stored in the external memory 6 are rewritable (programmable) by the CPU 1.

Embodiment 2

Although the embodiment 2 is assumed to use the data transfer control device with the same configuration as the foregoing embodiment 1, the transfer destination peripheral (peripheral (B), here) 3, which is a target of the data transfer, is assumed to be a memory such as a NAND flash memory that needs to have an external error check function.

In this case, the arithmetic unit 53 the DMA controller 5 includes adds an error correcting code such as an ECC (Error Correcting Code) to the data read out of the peripheral (A) 2, and transfers to the peripheral (B) 3. Alternatively, it can carry out the error check and error correction in the background by reading and decoding the data of the peripheral (B) 3 which is stored after adding the error correcting code.

More specifically, at step ST206 shown in the flowchart of FIG. 2, the arithmetic unit 53 reads the transfer data successively from the peripheral (A) 2 in accordance with the address signal output from the address management unit 54. Then, in accordance with the select signal output from the control unit 52, the arithmetic unit 53 performs, at step ST207, the operation on the data with the prescribed length set in the data register 55 to add the ECC, and writes into the data register 55. After that, at step ST208, the arithmetic unit 53 reads out the data including the ECC, which has been written in the data register 55, and transfers it to the peripheral (B) 3 via the CPU bus 7.

According to the foregoing embodiment 2, it becomes unnecessary for the transfer destination peripheral (B) 3 to have a circuit block including the ECC function by adding, by the DMA controller 5 (arithmetic unit 53), the error correcting code to the data read out of the transfer source peripheral (A) 2 and by transferring to the transfer destination peripheral (B) 3. Accordingly, the present embodiment 2 offers an advantage of being able to reduce the size of the circuit. In addition, the foregoing advantage appears more clearly by executing the background error check of the transfer destination peripheral (B) 3 that stores the data to which the arithmetic unit 53 adds the error correcting code.

In addition, since the DMA controller 5 (arithmetic unit 53) is programmable as in the embodiment 1, it can apply various error correcting algorithms. Thus, it offers an advantage of being able to provide flexibility to the error check or correction.

Embodiment 3

FIG. 4 is a block diagram showing a configuration of the computer system of an embodiment 3 in accordance with the present invention. Although it has the same configuration as the embodiment 1 shown in FIG. 1, basically, it has a configuration in which the arithmetic unit 53 included in the DMA controller 5 is replaced by a comparator 56.

As shown in FIG. 4, it has a configuration of inputting the data read out of the peripheral (A) 2 to the comparator 56 of the DMA controller 5; comparing it with a threshold; and transferring to the transfer destination peripheral (B) 3 after adding "1" to a specific bit in the data when it is greater than the threshold or adding "0" thereto when it is less than the threshold.

More specifically, at step ST206 shown in the flowchart of FIG. 2, the comparator 56 reads the transfer data successively from the transfer source peripheral (A) 2 in accordance with the address signal output from the address management unit 54. Then, in accordance with the select signal output from the control unit 52, the omparator 56 performs, at step ST207, the comparing operation on the data set in the data register 55, for example, and writes into the data register 55.

In other words, the comparator 56 carries out the comparing operation between the output of the data register 55 which is input to a first input terminal with the threshold data input to a second input terminal, and sets the operation result into the data register 55, again. After that, at step ST208, the comparator 56 reads out the data that has been written in the data register 55, and transfers it to the transfer destination peripheral (B) 3 via the CPU bus 7.

In other words, the arithmetic unit 53 carries out the comparing operation between the output of the data register 55 which is input to a first input terminal with the threshold data input to a second input terminal, and sets the operation result into the data register 55, again. After that, at step ST208, the arithmetic unit 53 reads out the data that has been written in the data register 55, and transfers it to the transfer destination peripheral (B) 3 via the CPU bus 7.

The foregoing embodiment 3 carries out the data transfer after performing preprocessing operation which will become necessary for the transfer destination peripheral at the data transfer. Thus, it offers an advantage of being able to reduce the amount of the processing to be performed by the transfer destination peripheral, and to reduce the size of the circuit of the transfer destination peripheral.

As for the foregoing comparator 56, it can be replaced by the logical operation of the arithmetic unit 53 shown in the embodiment 1.

Incidentally, the foregoing data transfer control device (DMA controller 5) constitutes the main part of the computer system having the CPU 1 as a control center.

In this case, the computer system has the central processing unit 1 (CPU) and the plurality of peripheral devices (peripherals 2-4) serving as the data transfer source or transfer destination, which are connected in common via the bus (CPU bus 7); the external memory 6 that stores the data transfer instruction in advance which uses as its parameters the start memory addresses or start input/output addresses of the transfer source and transfer destination and the data transfer size; and the data transfer control device (DMA controller 5) that reads the data transfer instruction from the external memory 6, reads the target data from the transfer source peripheral device (such as the peripheral (A)) 2 in accordance with the parameters, and transfers the target data to the transfer destination peripheral device (such as the peripheral (B)) 3 after processing the target data.

The foregoing computer system constructs in the data transfer control device (DMA controller 5) the device for performing the operation requested by the transfer destination peripheral device on the data read out of the transfer source peripheral device. Thus, it can further reduce the processing load of the CPU 1 and improve the throughput. In addition, since it can make programmable the data transfer control including the operations, it can construct a flexible computer system.

Although the embodiments in accordance with the present invention have been described in detail with reference to the drawings, a concrete configuration is not limited to the embodiments. It can include designs and the like without departing from the gist of the present invention.

INDUSTRIAL APPLICABILITY

As described above, the data transfer control device and computer system in accordance with the present invention are made the data transfer control device and computer system that can further reduce the processing load of the CPU and improve the throughput by constructing the device for performing the operation requested by the transfer destination peripheral device on the data read out of the transfer source peripheral device. Thus, they are suitable for the data transfer control device and computer system that carry out the data transfer directly between the peripheral devices without the aid of the CPU.

What is claimed is:

1. A data transfer control device for controlling data transfer between peripheral devices including a memory without going through a central processing unit, the data transfer control device having a control component configured to be started by the central processing unit, to acquire, when carrying out data transfer from the first peripheral device to the second peripheral device, a data transfer instruction including, as its parameters, start memory addresses or start input/output addresses and data transfer size of the peripheral devices to be used as a transfer source and a transfer destination, to read target data from the first peripheral device in accordance with the parameters, and to process the target data, followed by transferring the target data to the second peripheral device, the control component comprising:
    an instruction decoder for decoding the data transfer instruction;
    a control unit for generating first and second control signals in accordance with the decoding result; and
    an arithmetic unit for acquiring the target data from the first peripheral device while successively updating addresses in accordance with the first control signal output from the control unit, for performing on the target data an operation required for the second peripheral device and designated from a plurality of arithmetical types by the second control signal, and for outputting the operated-on target data to the second peripheral device.

2. The data transfer control device according to claim 1, wherein the arithmetic unit
    performs bit shift operation on the data read out of the first peripheral device in accordance with the second control signal, and outputs to the second peripheral device.

3. The data transfer control device according to claim 1, wherein the arithmetic unit
    adds an error correcting code to the data read out of the first peripheral device in accordance with the second control signal, and outputs to the second peripheral device.

4. The data transfer control device according to claim 1, wherein the arithmetic unit
    performs an operation requested by the second peripheral device on the data read out of the first peripheral device in accordance with the second control signal, and outputs to the second peripheral device.

5. A computer system having a central processing unit and a plurality of peripheral devices to be used as a data transfer source or a transfer destination, which are connected via a bus, the computer system comprising an external memory for storing a data transfer instruction in advance, the data transfer instruction having, as its parameters, start memory addresses or start input/output addresses and data transfer size of the transfer source and of the transfer destination; and a data transfer control device for reading the data transfer instruction from the memory, for reading target data from the transfer source peripheral device in accordance with the parameters, and for processing the target data, followed by transferring the target data to the transfer destination peripheral device, the data transfer control device comprising:
    an instruction decoder for decoding the data transfer instruction;
    a control unit for generating first and second control signals in accordance with the decoding result; and
    an arithmetic unit for acquiring the target data from the transfer source peripheral device while successively updating addresses in accordance with the first control signal output from the control unit, for performing on the target data an operation required for the second peripheral device and designated from a plurality of arithmetical types by the second control signal, and for outputting the operated-on target data to the transfer destination peripheral device.

6. A data transfer control method for controlling data transfer between peripheral devices including a memory without going through a central processing unit, the method comprising:
    acquiring, when carrying out data transfer from the first peripheral device to the second peripheral device, a data transfer instruction including, as its parameters, start memory addresses or start input/output addresses and data transfer size of the peripheral devices to be used as a transfer source and a transfer destination;
    decoding the data transfer instruction;
    generating first and second control signals in accordance with the decoding result;
    acquiring target data from the transfer source peripheral based on the parameters device while successively updating addresses in accordance with the first control signal;
    performing an operation on the acquired target data required for the second peripheral device and designated from a plurality of arithmetical types by the second control signal; and
    outputting the operated-on target data to the transfer destination peripheral device based on the parameters.

7. The data transfer control method according to claim 6, where said step of performing includes performing a bit shift operation on the acquired target data.

8. The data transfer control method according to claim 6, where said step of performing includes adding an error correcting code to the acquired target data.

9. The data transfer control method according to claim 6, where said step of performing includes performing an operation requested by the transfer destination peripheral device during said acquiring in accordance with the second control signal.

10. A data transfer control method for controlling data transfer in a computer system between transfer source and transfer destination peripheral devices which are connected via a bus without going through a central processing unit, the method comprising:
    storing a data transfer instruction in advance in an external memory, the data transfer instruction having, as its parameters, start memory addresses or start input/output addresses and data transfer size of the transfer source and of the transfer destination;
    reading the data transfer instruction from the memory;
    decoding the read data transfer instruction;
    generating first and second control signals in accordance with the decoding result;

acquiring target data from the transfer source peripheral device based on the parameters while successively updating addresses in accordance with the first control signal;

performing an operation on the acquired target data required for the second peripheral device and designated from a plurality of arithmetical types by the second control signal; and outputting the operated-on target data to the transfer destination peripheral device based on the parameters.

* * * * *